(12) United States Patent
Carlberg et al.

(10) Patent No.: US 8,742,055 B2
(45) Date of Patent: Jun. 3, 2014

(54) PRODUCTION OF EPOXY RESINS USING IMPROVED ION EXCHANGE RESIN CATALYSTS

(75) Inventors: Philip J. Carlberg, Lake Jackson, TX (US); H. Robert Goltz, Midland, MI (US); Leming Gu, Lake Jackson, TX (US); William I. Harris, Midland, MI (US); David H. West, Bellaire, TX (US); William G. Worley, Missouri City, TX (US); Thomas C. Young, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 30 days.

(21) Appl. No.: 13/509,660

(22) PCT Filed: Dec. 7, 2010

(86) PCT No.: PCT/US2010/059177
§ 371 (c)(1),
(2), (4) Date: May 14, 2012

(87) PCT Pub. No.: WO2011/084304
PCT Pub. Date: Jul. 14, 2011

(65) Prior Publication Data
US 2012/0283453 A1 Nov. 8, 2012

Related U.S. Application Data

(60) Provisional application No. 61/286,847, filed on Dec. 16, 2009.

(51) Int. Cl.
*C08G 59/06* (2006.01)
*C08L 61/12* (2006.01)
*C07D 301/27* (2006.01)

(52) U.S. Cl.
USPC .............................. 528/87; 525/507; 549/517

(58) Field of Classification Search
USPC .............................. 528/87; 525/507; 549/517
See application file for complete search history.

(56) References Cited

U.S. PATENT DOCUMENTS

| | | | |
|---|---|---|---|
| 3,176,027 A | 3/1965 | Madfred et al. | |
| 3,372,142 A | 3/1968 | Smith et al. | |
| 3,925,407 A | 12/1975 | Stockinger et al. | |
| 4,014,824 A | 3/1977 | Stockinger et al. | |
| 4,276,406 A | 6/1981 | Monnerat et al. | |

(Continued)

FOREIGN PATENT DOCUMENTS

| | | |
|---|---|---|
| CN | 1546548 A | 11/2004 |
| CN | 1931890 A | 3/2007 |
| GB | 888945 A | 2/1962 |
| GB | 1159530 A | 7/1969 |

OTHER PUBLICATIONS

Dow, Product Information, DOWEX TM MSA-1C, 2009, p. 1-2.*

(Continued)

*Primary Examiner* — Taylor Victor Oh

(57) ABSTRACT

Use a modified, amine-functionalized anion exchange resin as a catalyst to produce a bishalohydrin ether and then dehydrohalogenate the bishalohydrin ether with an aqueous inorganic hydroxide mixture to yield a liquid epoxy resin.

7 Claims, 3 Drawing Sheets

(56) References Cited

U.S. PATENT DOCUMENTS

| | | |
|---|---|---|
| 4,313,886 A | 2/1982 | Massingill |
| 4,341,658 A | 7/1982 | Monnerat et al. |
| 5,310,955 A | 5/1994 | Shirtum et al. |
| 5,372,790 A | 12/1994 | Shirtum et al. |
| 5,663,455 A | 9/1997 | Harris et al. |
| 7,436,454 B2 | 10/2008 | Yamaguchi et al. |
| 8,461,286 B2 * | 6/2013 | Young et al. .................... 528/87 |

OTHER PUBLICATIONS

Anonymous. "Preparation of Halohydrin ether intermediates for epoxy resins—by reaction of epihalohydrin and phenolic compounds" vol. 417 No. 001, Jan. 10, 1999. XF002623357.

PCT/US2010/059177, International Search Report/Written Opinion of the International Searching Authority, Mar. 30, 2011.

PCT/US2010/059177, International Preliminary Report on Patentability, Jun. 19, 2012.

* cited by examiner

PRODUCTION OF EPOXY RESINS USING IMPROVED ION EXCHANGE RESIN CATALYSTS

This application is a non-provisional application claiming priority from the U.S. Provisional Patent Application No. 61/286,847, filed on Dec. 16, 2009, entitled "PRODUCTION OF EPOXY RESINS USING IMPROVED ION EXCHANGE RESIN CATALYSTS" the teachings of which are incorporated by reference herein, as if reproduced in full hereinbelow.

This invention relates generally to production of an epoxy resin, especially a liquid epoxy resin, using an ion exchange resin catalyst, especially an improved or modified anion exchange resin such as a functionalized, quaternary amine anion exchange resin as described more fully below.

In producing low molecular weight (e.g. containing at least 50 wt %, based on total epoxy resin weight, N=0 diglycidyl ether oligomer of a polyhydric phenol) epoxy resins from the polyhydric phenol and an epihalohydrins, one must accomplish two reactions: a. an etherification (coupling) reaction to make a bishalohydrin ether of the polyhydric phenol; and b. a dehalohydrogenation (epoxidation) reaction of the bishalohydrin ether of the polyhydric phenol with an inorganic hydroxide to make an epoxy resin. A first approach accomplishes the two reactions simultaneously, typically by adding an aqueous inorganic hydroxide mixture (usually 20 percent by weight (wt %) to 50 wt % sodium hydroxide (NaOH)) to an organic mixture containing the polyhydric phenol and the epihalohydrin. In a second approach, use a catalyst to etherify (couple) the polyhydric phenol and the epihalohydrin to produce the bishalohydrin ether, and then, sequentially, effect the dehalohydrogenation (epoxidation) reaction by adding the aqueous inorganic hydroxide mixture to an organic mixture containing the bishalohydrin ether and an organic solvent (e.g. excess epihalohydrin). In both approaches, one faces a significant challenge in trying to accomplish these reactions rapidly in equipment that does not require a large capital investment, yet doing so in such a way that the epoxy resin meets desired product specification while minimizing raw material loss due to side reactions.

The first approach, used more often than the second approach, employs a plurality of batch reactors and excess epihalohydrin in the organic mixture. One may leave water in the reactor to form a two-phase mixture or remove it by azeotropic distillation to precipitate inorganic halide salt. In either case, limitations on maximum size of the reactors means that a large facility will contain multiple batch reactors, thereby increasing facility cost.

The second, less frequently used, approach uses any of a number of previously-identified etherification (coupling) catalysts such as quaternary ammonium or phosphonium halides, hydroxides, carbonates and carboxylates, alkali metal or alkaline earth halides, carbonates, hydroxides and carbonates, sulfonium halides, tertiary amines, tertiary phosphines, organic sulfides, tertiary ammonium alkylides, tertiary phosphonium alkylides, betaines and Lewis acids. Many of such catalysts suffer from one or more of several problems. Some of the catalysts (e.g. hydroxides, tertiary amines, tertiary phosphines, and carboxylates) function as both a catalyst and a reactant and are consumed during the reaction. Some catalysts (e.g. tertiary amines and tertiary phosphines) also initiate an irreversible reaction between the epihalohydrin or the epoxy resin, forming undesirable adducts of the catalyst that cannot easily be removed from the epoxy resin. Some catalysts (e.g. Lewis acids) suffer from poor selectivity, giving undesirable product quality. Some (e.g. inorganic halides) have very low solubility in the epihalohydrin/phenol mixture and thus either cannot easily catalyze the reaction or otherwise give only very low catalytic activity. While some (e.g. quaternary ammonium or phosphonium halides) have high catalytic activity, are not consumed by the reaction, give good product quality and are easily separated from the product, they cannot easily be recovered for reuse, resulting in high catalyst and waste disposal costs.

In order to facilitate separation of catalyst from epoxy resin product, one may immobilize at least some of the above etherification catalysts by attaching them to supports that are insoluble in the reaction fluids.

U.S. Pat. No. 3,176,027 and British Patent (GB) 888,945 describe production of glycidyl ethers of monohydric phenols or polyhydric phenols by reacting a phenol with a haloepoxyalkane (epihalohydrin) in the presence of high-molecular-weight catalysts that are insoluble in the reaction medium. The catalysts contain polar groups, where the polar groups are either (i) salt-like groups, (ii) groups capable of forming salt-like groups in the reaction mixture or (iii) acid amide groups. The catalyst may be an anion exchange resin that contains an amino, quaternary ammonium, quaternary phosphonium or ternary sulfonium group. Working examples address use of Dowex™ 1X10 and Lewatit™ MN anion exchange resins. Dowex™ 1X10 is a quaternary amine styrene-divinylbenzene type anion exchange resin, and Lewatit™ MN is described as being a strongly basic polycondensate which contains quaternary amine groups.

GB 1,159,530, U.S. Pat. Nos. 3,925,407 and 4,014,824 teach that quaternary ammonium anion exchange resins can be used to catalyze the etherification reaction between a phenol, an aliphatic alcohol or an amine and an epihalohydrin.

U.S. Pat. No. 3,372,142 provides an example using a "strong anion exchange resin" to catalyze the reaction between epichlorohydrin and phenol.

U.S. Pat. Nos. 4,313,886, 5,310,955 and 5,372,790 teach that basic ion exchange resins, such as Dowex™ MSA-1, Dowex™ 11 and Dowex™ SBR, are suitable as catalysts for the etherification reaction between epihalohydrins and dihydric phenols.

U.S. Pat. Nos. 4,276,406 and 4,341,658 describe use of cation exchange resins treated with (non-crosslinked) polymers containing a plurality of quaternary "onium" (ammonium, phosphonium or sulfonium) cations as catalysts for this reaction. They suggest that use of highly crosslinked anion exchange resins, such as Dowex™ MSA-1, as catalysts for the etherification reaction between polyhydric phenols and epihalohydrins results in formation of high levels of undesirable byproducts.

Chinese Patent Publication (CN) 1,931,890 discusses preparation of dried quaternary ammonium exchange resins, treated to contain only hydroxide anions. It also describes a batch procedure that uses the treated anion exchange resins as catalysts and reactants for the etherification and dehydrohalogenation of bisphenol-A and epichlorohydrin to produce a liquid epoxy resin.

CN 1,546,548 teaches preparation of low-molecular weight bisphenol-A epoxy resin using either carbonate salts or anion exchange resins as catalysts. The teachings include a batch procedure in which bisphenol-A, epichlorohydrin and either carbonate salts or anion exchange resins in the hydroxide form are combined and reacted for 3-10 hours at 60-110 deg C., followed by filtration and devolatilization.

CN 1,941,890 and CN 1,546,548 both provide for use of anion exchange resins in the hydroxide form as a replacement for sodium hydroxide in batch caustic coupling and epoxidation reactions to make bisphenol-A liquid epoxy resins. Used this way, the ion exchange resins are reactants, not catalysts.

There continues to be a need for an insoluble etherification catalyst that has higher activity (e.g. faster conversion of phenolic OH content) and higher selectivity (e.g. produces a product with lower oligomer content) than the catalysts disclosed in the prior art.

Figure 1:
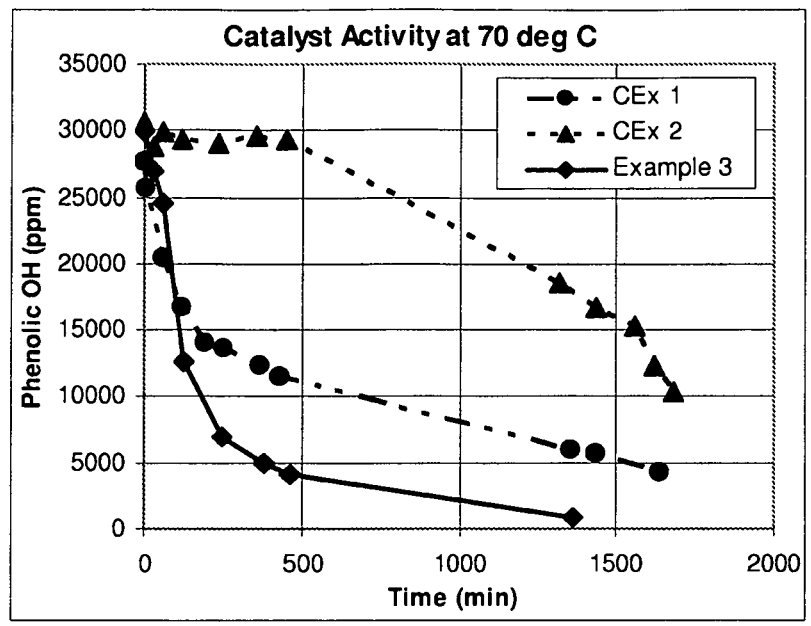
FIG. 1 is a graphic portrayal of catalyst activity for Ex 3 (Dowex™ 1X2) relative to CEx 1 (Dowex™ MSA1) and CEx 2 (Dowex™ 1X8).

In some aspects, this invention is an improved process for producing a liquid epoxy resin by etherifying a polyhydric phenol and an epihalohydrin with an amine-functionalized anion exchange resin as a catalyst to produce a bishalohydrin ether and dehydrohalogenating the bishalohydrin ether with an aqueous inorganic hydroxide mixture, the bishalohydrin ether optionally being in admixture with an organic solvent, wherein the improvement comprises using a modified amine-functionalized anion exchange resin as an etherification catalyst, the modified amine-functionalized anion exchange resin having at least one of a) a polymerized crosslinking monomer content within a range of from 0.1 percent by weight (wt %) to 4 wt %, each percent by weight being based upon total weight of the monomers used to prepare the anion exchange resin copolymer, b) an average particle size within a range of from 10 micrometers (μm) to 200 μm, c) a degree of functionalization such that from 2 percent to 60 percent of monomer units in the modified amine-functionalized anion exchange resin are functionalized, and d) functionalization with quaternary ammonium groups represented by a formula —NR$_3$$^+$X$^-$ wherein each R is independently an alkyl group or an alkoxy group having at least two carbon atoms.

Anion exchange resins suitable for use in this invention include any ion exchange resin comprising a cation bound to a crosslinked polymer, which can exchange anions. Examples of suitable anion exchange resins include chloromethylated crosslinked polystyrene quaternized with tertiary amines, crosslinked polyacrylates quaternized with polyamines containing quaternary amine groups, quaternized crosslinked polyvinylpyridine and resins prepared by copolymerizing vinylbenzylchloride, divinylbenzene and, optionally, a third monomer selected from styrene, alkylstyrenics, acrylates and methacrylates. Suitable anion exchange resins may also be prepared by functionalization of chloromethylated crosslinked polystyrene with quaternary phosphonium or tertiary sulfonium groups. Chloromethylated crosslinked polystyrene quaternized with tertiary amines are preferred. The anion exchange resin may be either gel type or macroporous.

Examples of suitable crosslinking monomers (i.e., polyvinylidene compounds) include polyvinylidene aromatics such as divinylbenzene, divinyltoluene, divinylxylene, divinylnaphthalene, trivinylbenzene, bis(vinylphenyl)alkanes, divinyldiphenylsulfone, as well as diverse alkylene diacrylates and alkylene dimethacrylates. Preferred crosslinking monomers are divinylbenzene, trivinylbenzene, and bis(vinylphenyl)ethane. The terms "crosslinking agent," "crosslinker" and "crosslinking monomer" are used herein as synonyms and are intended to include both a single species of crosslinking agent along with combinations of different types of crosslinking agents In some aspects of this invention, use a modified amine-functionalized anion exchange resin prepared by amination of a chloromethylated copolymer using a tertiary amine represented by Formula 1.

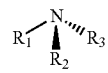

Formula 1 wherein $R_1$, $R_2$ and $R_3$ are each independently selected from: alkyl and alkoxy groups; with the proviso that the total number of carbon atoms for $R_1$, $R_2$ and $R_3$ is at least 6, but preferably at least 8, 9, 10, 11 and in some embodiments at least 12. In several embodiments, $R_1$, $R_2$ and $R_3$ are independently selected from alkyl or alkoxy groups comprising from 1 to 8 carbon atoms with the proviso that the total number of carbon atoms is at least 8. Each alkyl or alkoxy group ($R_1$, $R_2$ and $R_3$) may independently be: straight (e.g. ethyl, propyl, butyl, pentyl, etc.) or branched (e.g. isopropyl, isobutyl, etc.), and may be unsubstituted or substituted (e.g. substituted with such groups as a hydroxyl). In a preferred embodiment, the three alkyl groups ($R_1$, $R_2$ and $R_3$) are independently selected from unsubstituted alkyl groups which may be straight or branched. In another embodiment, the three alkyl groups or moieties are selected from: ethyl, propyl, butyl, pentyl, and hexyl moieties. In yet another preferred embodiment, $R_1$, $R_2$ and $R_3$ are each a n-butyl group, i.e. tri-n-butyl amine. In other embodiments, "mixed species" of the subject tertiary amines may be used, or the subject tertiary amines may be used in combination with amines falling outside the definition provided above, e.g. primary and secondary amines, or tertiary amines falling outside the scope of Formula 1.

Suitable tertiary amines include those selected from a group consisting of tri-n-pentylamine, tri-n-hexylamine, tri-n-heptylamine, tri(isooctyl)amine, trimethylamine, triethylamine, tri-n-propylamine, tri-n-butyl amine, and tri(isobutyl)amine. One may use such amines either alone or in any combination of two or more members of the group.

Counterion X$^-$ in formula —NR$_3$$^+$X$^-$ may be any inorganic or organic anion that serves to catalyze the etherification reaction, such as halogens, hydroxides, carboxylates, carbonates, and sulfates. The anion may be monovalent or multivalent. The anion is preferably a halogen, more preferably identical to the halogen in the epihalohydrin.

In some aspects of this invention, less than all of the monomer units of the crosslinked copolymer are functionalized with ion exchange groups. Most anion exchange resins are prepared in a manner that maximizes degree of functionalization of monomer units, in order to maximize resin dry weight exchange capacity (measured in milliequivalents per gram (meq/g)). For chloromethylated styrene/divinylbenzene anion exchange resins prepared by quaternization with trimethylamine, for example, the degree of monomer unit functionalization typically is from 80% to less than 100%, and is reduced by incomplete chloromethylation, methylene bridging between monomer units that occurs due to side reaction during the chloromethylation reaction and incomplete amination of the chloromethylated sites or loss of the chloromethylated sites by side reactions during amination (e.g. hydrolysis). One may calculate degree of monomer functionalization from anion exchange resin dry weight capacity and molecular weight of functionalized and non-functionalized comonomers in the anion exchange resin.

See Helfferich, *Ion Exchange*, McGraw-Hill, 1962, p. 52 and Dorfner, *Ion Exchangers*, Walter de Gruyter, 1991, p.

238-239 for teachings about partial chloromethylation. One may restrict the amount of tertiary amine used during amination to aminate only a portion of the chloromethylated monomer units or moieties. Alternatively, one may use a less reactive tertiary amine during amination, so that only a portion of the chloromethylated monomer units are aminated, while other chloromethylated monomer units are converted to benzyl alcohol, benzyl ether groups or other species by side reactions.

In some aspects of this invention, the degree of monomer unit functionalization ranges from 2% to 60%, preferably from 10% to 40%.

In some aspects of this invention, dry weight anion exchange capacity is less than 3.5 meq/g, and preferably between 0.5 meq/g and 3.0 meq/g.

In some aspects of this invention, the anion exchange resins, especially gel type anion exchange resins, have an average particle size of 200 micrometers (μm) or less. The average particle size is preferably within a range of from 10 μm to 200 μm and more preferably from 20 μm to 100 μm. This contrasts with conventional anion exchange resins that have an average particle size of from 50 mesh (289 μm) to 20 mesh (841 μm) to provide convenient handling and low pressure drop in fixed bed operation.

The anion exchange resin may have a broad, narrow or uniform particle size distribution. Narrow or uniform particle size distributions are preferred.

In some aspects of this invention, the anion exchange resin is prepared using a low amount (0.1 weight percent (wt %) to 4 wt %, based upon total weight of monomers used during copolymer production prior to functionalization) of crosslinking monomer. By way of contrast, most gel-type anion exchange resins are prepared with from 2 wt % to 10 wt crosslinking monomer and most macroporous anion exchange resins are prepared with from 4 wt % to 10 wt % crosslinking monomer.

The polyhydric phenol may be one of a variety of starting materials, including bisphenol-A, bisphenol-F, phenol-formaldehyde novolacs, cresol-formaldehyde novolacs, bisphenol-A-formaldehyde novolacs, trisphenols, biphenols, diphenols, and hydroquinone. Other polyhydric phenols may be found in U.S. Pat. Nos. 3,372,142, 4,313,886, 5,310,955, and 5,372,790. Bisphenol-A is an especially preferred polyhydric phenol.

The epihalohydrin may be any known epihalohydrin, with epichlorohydrin, epibromohydrin, and methylepichlorohydrin being preferred and epichlorohydrin being more preferred.

The inorganic hydroxide may be an alkali metal hydroxide, such as sodium hydroxide or potassium hydroxide, or an alkaline earth metal hydroxide such as calcium hydroxide. Sodium hydroxide is a preferred inorganic hydroxide.

The reactions may be conducted in the presence of a cosolvent. Preferred cosolvents include any solvent that contains an alcohol functionality. Examples of suitable aliphatic alcohols include methanol, ethanol, n-propanol, 2-propanol, n-butanol, 2-butanol, t-butanol, 2-methyl-2-butanol, 1-pentanol, 2-pentanol, 3-pentanol, 2-methyl-1-pentanol, 2-methyl-2-pentanol and 4-methyl-2-pentanol. Examples of suitable alcohol with ether functionalities are 1-methoxy-2-ethanol, 1-ethoxy-2-ethanol, 1-butoxy-2-ethanol, 1-methoxy-2-propanol, 1-ethoxy-2-propanol, 1-isobutoxy-2-propanol, 1-phenoxy-2-propanol, 1-methoxy-2-butanol, 3-methoxy-1-butanol, 3-methoxy-3-methylbutanol, ethylene glycol monoisopropyl ether, ethylene glycol monoisobutyl ether, ethylene glycol mono-n-butyl ether, and ethylene glycol mono-tert-butyl ether.

The reaction may also be conducted in the presence of an organic dilution solvent. The dilution solvent may be any solvent which increases solubility of the epoxy resin in the organic phase. The dilution solvent, when used, preferably contains no functionalities that react easily with the polyhydric phenol, the epihalohydrin, the alkali metal or alkali earth metal hydroxide, or water. The dilution solvent preferably has limited solubility in water to facilitate brine separation and water washing. Examples of suitable dilution solvents include aromatic hydrocarbons, halogenated hydrocarbons, ketones and ethers. Especially suitable dilution solvents include, but are not limited to, toluene, xylenes, methyl ethyl ketone and methyl isobutyl ketone. Mixtures of one or more of these solvents may also be used.

The etherification reaction is preferably conducted at a temperature between 20 degrees centigrade (° C.) and 100° C., more preferably between 40° C. and 70° C. The etherification reaction is preferably conducted with an excess of the epihalohydrin, more preferably using from more than 1 mole to 20 moles of the epihalohydrin per mole-equivalent of phenolic hydroxyl (OH) moiety, and most preferably using between 2 moles and 10 moles of epihalohydrin per mole-equivalent of phenolic OH moiety.

COMPARATIVE EXAMPLE (CEX) 1

Prepare Dowex™ MSA-1 anion exchange resin (quaternary trimethylammonium chloride form styrene-divinylbenzene type, macroporous, total exchange capacity 1.0 meq/ml, dry weight capacity 4.2 meq/g) for use by washing it with deionized water, solvent exchanging the resin with methanol to remove the water, then placing it in a vacuum oven to dry overnight at 60 degrees centigrade (° C.).

Place 28 grams (g) of the dried anion exchange resin, 80 g of purified p,p'-bisphenol A and 320 g of epichlorohydrin in a jacketed, agitated 5-necked 1-liter (L) round-bottomed flask equipped with an agitator, a thermocouple and a condenser. Purge the flask with a small flow (5 milliliters per minute (ml/min)-10 ml/min) of nitrogen. Recirculate a heated glycol/water mixture through the jacket to heat flask contents to a set point temperature of 70° C. and maintain that temperature throughout this CEx 1. Add 28 g of the dried anion exchange resin to the heated flask contents. Periodically remove samples from the flask and analyze the samples by ultraviolet (UV) absorption and high performance liquid chromatography (HPLC) to determine the phenolic hydroxyl (OH) content and reaction mixture composition. Stop the reaction after 27 hours by removing the contents of the flask and separating the ion exchange resin catalyst from other contents of flask. The flask contents show a phenolic OH conversion of 85%, and a reaction mixture composition that contains an epoxy resin comprising 79% N=0, 14.8% N=1, 2.1% N=2 and 0.03% N=3 diglycidyl ether of bisphenol-A (DGEBA) oligomers with a mixture of chlorohydrin, glycidyl ether and phenolic OH endgroups.

CEX 2

Replicate CEx 1, but use Dowex™ 1X8 anion exchange resin (quaternary trimethylammonium chloride form styrene-divinylbenzene type, gel, 8% divinylbenzene crosslinked, 20 mesh (841 micrometer (μm)) to 50 mesh (289 μm) size (with size determination based on wet resin), total exchange capacity 1.3 meq/ml, dry weight capacity 3.9 meq/g), and stop the reaction after 28 hours. The flask contents show a phenolic OH conversion of only 66%.

EXAMPLE (EX) 3

Replicate CEx 1, but use Dowex™ 1X2 anion exchange resin (quaternary trimethylammonium chloride form styrene-divinylbenzene type, gel, 2% divinylbenzene crosslinked, 16 mesh (1 millimeter (mm)) to 100 mesh (149 µm) size (with size determination based on wet resin), total exchange capacity 0.8 meq/ml, dry weight capacity 4.3 meq/g), and stop the reaction after 23 hours. The flask contents show a phenolic OH conversion of 97%, and a reaction mixture composition that contains an epoxy resin comprising 77% N=0, 15.6% N=1, 3.2% N=2 and 0.4% N=3 DGEBA oligomers.

FIG. 1 shows catalyst activity for Ex 3 (Dowex™ 1X2) relative to CEx 1 (Dowex™ MSA1) and CEx 2 (Dowex™ 1X8). FIG. 1 suggests that ion exchange resins with lower crosslinking density (Ex 3 at 2% versus CEx 1 at 6% and CEx 2 at 8%) have higher activity.

EX 4

Figure 2:
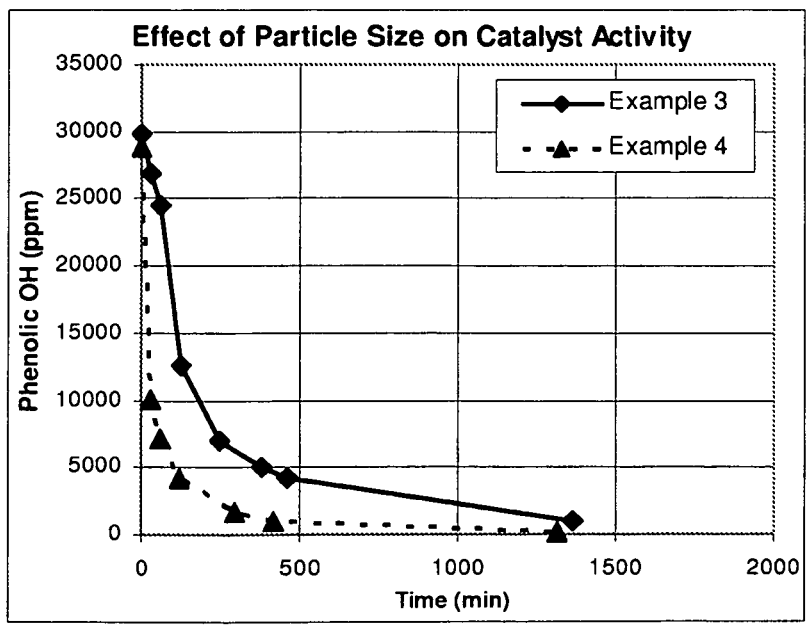
FIG. 2 is a graphic portrayal of catalyst activity for Ex 3 and Ex 4.
Figure 3:
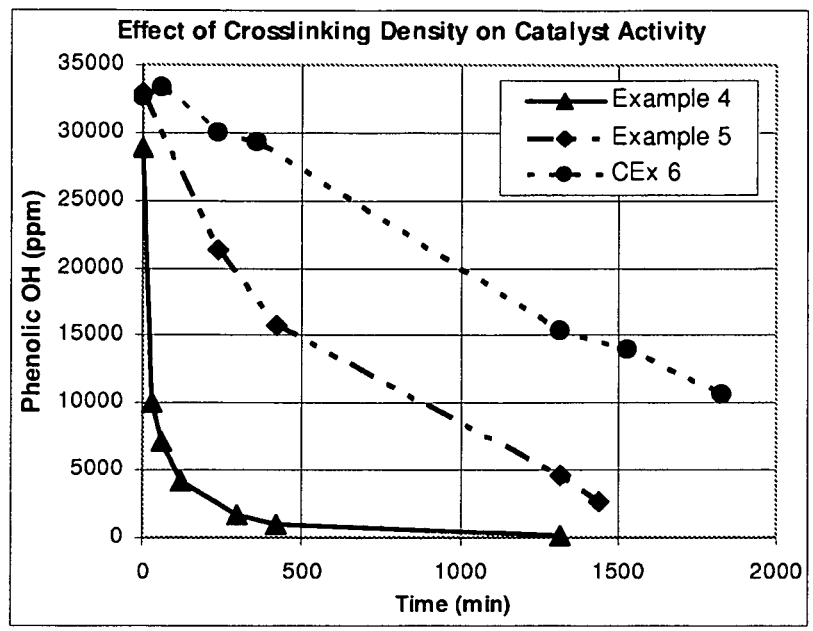
FIG. 3 is a graphic portrayal of catalyst activity of Ex 5, CEx 1 and CEx 6.

Replicate Ex 3, but use fine mesh (200 mesh (74 µm) to 400 mesh (37 µm)) (with size determination based on wet resin) Dowex™ 1X2 anion exchange resin and stop the reaction after 7 hours. The flask contents show a phenolic OH conversion of 97%, and a reaction mixture that contains an epoxy resin comprising 88% N=0, 8.1% N=1 and 0.5% N=2 DGEBA oligomers, which is a much lower oligomer content than obtained with normal mesh size Dowex™ 1X2 as in Ex 3. FIG. 2 compares catalyst activity of this Ex 4 with Ex 3 and suggests that gel-type ion exchange resins with smaller particle size of Ex 4 have higher activity than the larger particle size resin of the same type used in Ex 3.

EX 5 AND CEX 6

Replicate CEx 1, but use Dowex™ 1X4 resin (4% divinylbenzene crosslinked) for Ex 5 and Dowex™ 1X8 (8% divinylbenzene crosslinked) resin for CEx 6. Both resins are anion exchange resins (quaternary trimethylammonium chloride form styrene-divinylbenzene type, gel, with a particle size range of from 200 mesh (74 µm) to 400 mesh (37 µm) (with size determination based on wet resin). Stop the reaction after 24 hours for Ex 5 and 30 hours for CEx 6. Ex 5 flask contents show a phenolic OH conversion of 92% conversion and a reaction mixture composition that comprises 72% N=0, 18.3% N=1, 3.7% N=2 and 0.8% N=3 DGEBA oligomers. CEx 6 flask contents show a phenolic OH conversion of only 68%, a value low enough to make determination of oligomer content of little use. The flask contents analysis suggest that the catalyst of Ex 5, with a crosslinking monomer content of 4%, is more active than that of CEx 6, with a higher crosslinking monomer content of 8%. Ex 4 above, with a crosslinking monomer content of 2% is even more active than Ex 5.

EX 7-9

Figure 4:
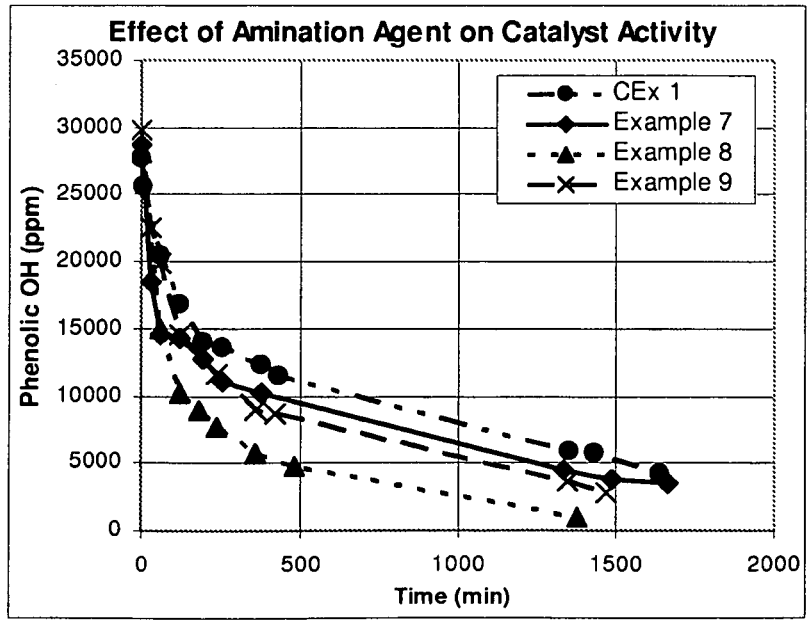
FIG. 4 is a graphic portrayal of catalyst activity of Ex 7-9.

Replicate CEx 1, but use Dowex™ NSR-1 anion exchange resin (quaternary triethylammonium chloride form styrene-divinylbenzene type, macroporous, total exchange capacity 0.9 meq/ml) for Ex 7, Dowex™ PSR-3 anion exchange resin (quaternary tributylammonium chloride form styrene-divinylbenzene type, macroporous, total exchange capacity 0.6 meq/ml) for Ex 8, and Lanxess/Sybron Ionac™ SR7 (quaternary tripropylammonium chloride form styrene-divinylbenzene type, macroporous, total exchange capacity 0.6 meq/ml) for Ex 9. FIG. 4 compares catalyst activity for Ex 7-9 with that of CEx 1 and suggests that amination of anion exchange resins with alkyl groups larger than methyl groups leads to higher catalyst activity.

EX 10-13

Replicate CEx 1, but use quaternary trimethylammonium chloride macroporous anion exchange resins described in Table 1, which may be prepared by copolymer production methods similar to those described in U.S. Pat. No. 5,663,455 (with a divinyl benzene content of 3 wt % and use of 47 wt % of a porogen, an organic solvent in which monomers, but not the copolymers, are soluble), chloromethylation techniques which use control of temperature and time to control extent of chloromethylation (such as described in Helfferich, *Ion Exchange*, McGraw-Hill, 1962, p. 52 and Dorfner, *Ion Exchangers*, Walter de Gruyter, 1991, p. 238-239) and amination in excess trimethylamine (TMA) at 40° C. for 4 hours (ex. 10-12) or with less than a stoichiometric amount of trimethylamine at 40° C. for 4 hours (ex. 13). Wash the aminated resins then measure their anion exchange characteristics using standard anion exchange characterization methods such as those given by ASTM method D2187.

Figure 5:
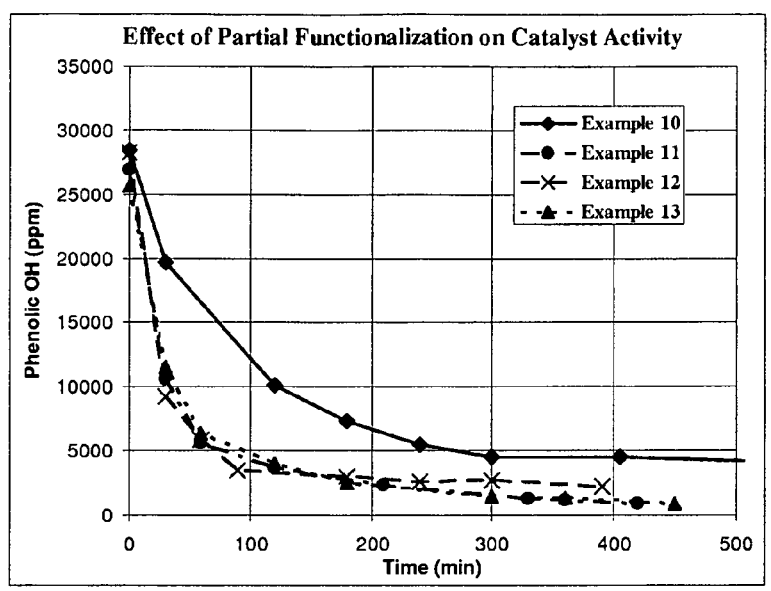
FIG. 5 is a graphic portrayal of catalyst activity of Ex 10-13.

Test the anion exchange resins for catalytic activity as in CEx 1. FIG. 5 compares activities of the catalysts (Ex 10-13). Table 2 below summarizes oligomer content of reaction products for each catalyst (Ex 10-13). FIG. 5 and the results summarized in Table 2 demonstrate that partially functionalized anion exchange resins with lower dry weight capacity (Ex 11-13) have higher activity and generate a product with lower oligomer content than fully functionalized anion exchange resins (Ex 10).

TABLE 1

| Ex/Property | Copolymer DVB/Porogen (%) | Water Retention Capacity (%) | Wet Volume Capacity (meq/ml) | Dry Weight Capacity (meq/g) | Degree of Monomer Functionalization (%) |
|---|---|---|---|---|---|
| 10 | 3/47 | 78 | 0.70 | 4.6 | 97 |
| 11 | 3/47 | 79 | 0.45 | 3.2 | 52 |
| 12 | 3/47 | 75 | 0.44 | 2.5 | 37 |
| 13 | 3/47 | 65 | 0.31 | 1.3 | 17 |

TABLE 2

| | Product Oligomer Content | | |
|---|---|---|---|
| Ex | N = 0 | N = 1 | N = 2 |
| 10 | 81.1 | 13.2 | 1.8 |
| 11 | 83.1 | 12.9 | 1.3 |
| 12 | 87.7 | 8.9 | 0.6 |
| 13 | 87.9 | 9.2 | 0.6 |

What is claimed is:

1. An improved process for producing a liquid epoxy resin by etherifying a polyhydric phenol and an epihalohydrin with an amine-functionalized anion exchange resin as a catalyst to produce a bishalohydrin ether and dehydrohalogenating the bishalohydrin ether with an aqueous inorganic hydroxide mixture, the bishalohydrin ether optionally being in admixture with an organic solvent, wherein the improvement comprises using a modified amine-functionalized anion exchange resin as an etherification catalyst, the modified amine-functionalized anion exchange resin having at least one of a) a polymerized crosslinking monomer content within a range of from 0.1 percent by weight to 4 percent by weight, each percent by weight being based upon total weight of the monomers used to prepare the anion exchange resin copolymer, b) an average particle size within a range of from 10 micrometers to 200 micrometers (with size determination based on wet resin), c) a degree of functionalization such that from 2 percent to 60 percent of monomer units in the modified amine-functionalized anion exchange resin are functionalized, and d) functionalization with quaternary ammonium groups represented by a formula —$NR_3^+X^-$ wherein each R is independently an alkyl group or an alkoxy group having at least two carbon atoms and wherein X is an anion selected from the group consisting of a halogen, a hydroxide, a carboxylate, a carbonate, and a sulfate.

2. The process of claim 1, wherein the crosslinking monomer is selected from a group consisting of polyvinylidene aromatics, alkylene diacrylates and alkylene dimethacrylates.

3. The process of claim 1, wherein the crosslinking monomer is a polyvinylidene aromatic selected from a group consisting of divinylbenzene, divinyltoluene, divinylxylene, divinylnaphthalene, trivinylbenzene, bis(vinylphenyl)alkanes, divinyldiphenylsulfone.

4. The process of claim 1, wherein the crosslinking monomer is divinylbenzene.

5. The process of claim 1, wherein each R has no more than eight carbon atoms.

6. The process of claim 1, wherein the modified amine-functionalized anion exchange resin has a dry weight capacity of 3.5 meq/g or less.

7. The process of claim 1, wherein the polyhydric phenol is Bisphenol A and the epihalohydrin is epichlorohydrin.

\* \* \* \* \*